United States Patent
Baek et al.

(10) Patent No.: US 12,241,988 B2
(45) Date of Patent: Mar. 4, 2025

(54) METHOD FOR PERFORMING POSITIONING BY USER EQUIPMENT IN WIRELESS COMMUNICATION SYSTEM SUPPORTING SIDELINK, AND APPARATUS THEREFOR

(71) Applicant: LG ELECTRONICS INC., Seoul (KR)

(72) Inventors: Jongseob Baek, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 17/768,303

(22) PCT Filed: Oct. 14, 2020

(86) PCT No.: PCT/KR2020/014009
§ 371 (c)(1),
(2) Date: Apr. 12, 2022

(87) PCT Pub. No.: WO2021/075851
PCT Pub. Date: Apr. 22, 2021

(65) Prior Publication Data
US 2023/0221397 A1    Jul. 13, 2023

(30) Foreign Application Priority Data

Oct. 15, 2019  (KR) .................. 10-2019-0127455
Oct. 15, 2019  (KR) .................. 10-2019-0127631

(51) Int. Cl.
*G01S 5/00* (2006.01)
*H04L 5/00* (2006.01)
*H04W 72/25* (2023.01)

(52) U.S. Cl.
CPC .......... *G01S 5/0063* (2013.01); *H04L 5/0051* (2013.01); *H04W 72/25* (2023.01)

(58) Field of Classification Search
CPC ..... G01S 5/0063; H04W 72/25; H04L 5/0051
(Continued)

(56) References Cited

U.S. PATENT DOCUMENTS

2012/0208552 A1    8/2012   Siomina et al.
2013/0053056 A1    2/2013   Aggarwal et al.

FOREIGN PATENT DOCUMENTS

WO    2019083344 A1    5/2019

OTHER PUBLICATIONS

Liu et al, "Prospective Positioning Architecture and Technologies in 5G Networks" IEEE vol. 31 No. 6 pp. 115-121, Nov. 1, 2017 (Year: 2017).*

(Continued)

*Primary Examiner* — Ahmad F. Matar
*Assistant Examiner* — Jirapon Tulop
(74) *Attorney, Agent, or Firm* — BRYAN CAVE LEIGHTON PAISNER LLP

(57) ABSTRACT

A method and an apparatus for performing positioning by a user equipment (UE) in a wireless communication system supporting a sidelink according to various embodiments are disclosed. Disclosed are a method and an apparatus therefor, the method comprising the steps of: receiving a plurality of pieces of sidelink control information (SCI) including scheduling information of a PRS from a plurality of anchor nodes; receiving a plurality of PRSs on the basis of the plurality of pieces of SCI; on the basis of the positional relationship of the plurality of anchor nodes, detecting ambiguity in position measurement based on the plurality of PRSs; requesting an angle of arrival (AoA) report from one anchor node among the plurality of anchor nodes on the (Continued)

basis of the detected ambiguity in position measurement; and measuring the position of the UE on the basis of the plurality of PRSs and the reported AoA.

9 Claims, 18 Drawing Sheets

(58) Field of Classification Search
USPC .................................................... 455/456.1
See application file for complete search history.

(56) References Cited

OTHER PUBLICATIONS

R1-1910035: "NR positioning measurement," 3GPP TSG RAN WG1 Meeting #98bis, Chongqing, China, Oct. 14-20, 2019, Huawei, HiSilicon, Oct. 5, 2019 (19 pages).

R1-1910676: "Remaining Details of Physical Layer Measurements for NR Positioning," 3GPP TSG RAN WG1 Meeting #98bis, Chongqing, China, Oct. 14-20, 2019, Intel Corporation, Oct. 5, 2019 (21 pages).

* cited by examiner (a)

(b)

(a)

(b)

(a)

(b)

METHOD FOR PERFORMING POSITIONING BY USER EQUIPMENT IN WIRELESS COMMUNICATION SYSTEM SUPPORTING SIDELINK, AND APPARATUS THEREFOR

This application is the National Stage filing under 35 U.S.C. 371 of International Application No. PCT/KR2020/014009 filed on Oct. 14, 2020, which claims priority to Korean Patent Application Nos. 10-2019-0127455 filed on Oct. 15, 2019 and 10-2019-0127631 filed on Oct. 15, 2019, the contents of which are all hereby incorporated by reference herein in their entirety.

TECHNICAL FIELD

Embodiments of the present disclosure relate to a method for performing positioning by a user equipment (UE) in a wireless communication system supporting sidelink, and a device for the same.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between UEs without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to provide a method and a device for quickly detecting Time Difference of Arrival (TDoA) positioning ambiguity through topology of anchor nodes in a broadcast TDoA positioning process, quickly solving TDoA positioning ambiguity caused by the topology of the anchor nodes through rapid execution of an angle of arrival (AoA) report requesting procedure based on the detected positioning ambiguity, thereby improving TDoA accuracy and minimizing a time required for TDoA execution.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solutions

In accordance with one aspect of the present disclosure, a method for performing positioning by a user equipment (UE) in a wireless communication system supporting sidelink may include: receiving, from a plurality of anchor nodes (ANs), a plurality of sidelink control information pieces (SCIs) including scheduling information of a positioning reference signal (PRS); receiving a plurality of PRSs based on the plurality of SCIs; detecting ambiguity of position measurement based on the plurality of PRSs, on the basis of positional relationship between the plurality of anchor nodes (ANs); requesting an angle of arrival (AoA) report from a single anchor node (AN) selected from among the plurality of anchor nodes (ANs) based on the detected ambiguity of position measurement; and measuring a position of the user equipment (UE) based on the plurality of PRSs and the reported AoA.

Alternatively, the ambiguity of the positioning measurement may be detected based on the positional relationship between the plurality of anchor nodes (ANs) that are arranged to be biased in a predetermined angular range with respect to the UE.

Alternatively, the UE may request the angle of arrival (AoA) report for the single anchor node (AN) through PRS transmission within a PRS resource pool pre-configured for the single anchor node (AN).

Alternatively, information about the pre-configured PRS resource pool may be obtained based on the SCI corresponding to the single anchor node (AN).

Alternatively, the angle of arrival (AoA) may be reported together with identification information corresponding to the transmitted PRS.

Alternatively, the single anchor node (AN) may be an anchor node (AN) corresponding to a PRS resource pool in which the smallest number of PRSs is detected from among a plurality of PRS resource pools for the plurality of anchor nodes (ANs).

Alternatively, the single anchor node (AN) may be an anchor node (AN) having the largest reference signal received power (RSRP) or the largest received signal strength indicator (RSSI) from among the plurality of anchor nodes (ANs).

Alternatively, information about the pre-configured PRS resource pool may be obtained in advance based on a master information block (MIB) or a system information block (SIB) included in a physical sidelink broadcast channel (PSBCH).

Alternatively, the plurality of anchor nodes (ANs) may include anchor nodes (ANs) each having positioning quality information (PQI) that is equal to or greater than a preconfigured threshold.

In accordance with another aspect of the present disclosure, a user equipment (UE) for performing positioning in a wireless communication system supporting sidelink may include a radio frequency (RF) transceiver, and a processor connected to the RF transceiver, wherein the processor is configured to: receive, from a plurality of anchor nodes (ANs), a plurality of sidelink control information pieces (SCIs) including scheduling information of a positioning reference signal (PRS), under control of the RF transceiver; receive a plurality of PRSs based on the plurality of SCIs; detect ambiguity of position measurement based on the plurality of PRSs, on the basis of positional relationship between the plurality of anchor nodes (ANs); request an angle of arrival (AoA) report from a single anchor node (AN) selected from among the plurality of anchor nodes (ANs) based on the detected ambiguity of position measurement; and measure a position of the user equipment (UE) based on the plurality of PRSs and the reported AoA.

Alternatively, the ambiguity of the positioning measurement may be detected based on the positional relationship between the plurality of anchor nodes (ANs) that are arranged to be biased in a predetermined angular range with respect to the UE.

Alternatively, the UE may request the angle of arrival (AoA) report for the single anchor node (AN) through PRS transmission within a PRS resource pool pre-configured for the single anchor node (AN).

In accordance with another aspect of the present disclosure, a chip set for performing positioning in a wireless communication system supporting sidelink may include at least one processor; and at least one memory operatively connected to the at least one processor, and configured to store instructions such that the at least one processor performs specific operations by executing the instructions, wherein the specific operations include: receiving, from a plurality of anchor nodes (ANs), a plurality of sidelink control information pieces (SCIs) including scheduling information of a positioning reference signal (PRS); receiving a plurality of PRSs based on the plurality of SCIs; detecting ambiguity of position measurement based on the plurality of PRSs, on the basis of positional relationship between the plurality of anchor nodes (ANs); requesting an angle of arrival (AoA) report from a single anchor node (AN) selected from among the plurality of anchor nodes (ANs) based on the detected ambiguity of position measurement; and measuring a position of the user equipment (UE) based on the plurality of PRSs and the reported AoA.

Alternatively, the processor may control a driving mode of a device connected to the chip set, based on the angle of arrival (AoA).

In accordance with another aspect of the present disclosure, a computer-readable storage medium configured to store at least one computer program including instructions such that at least one processor for use in a wireless communication system supporting sidelink performs specific operations of performing a positioning operation by executing the instructions may include at least one computer program for allowing the at least one processor to perform a positioning operation; and a computer-readable storage medium configured to store the at least one computer program, wherein the specific operations include: receiving, from a plurality of anchor nodes (ANs), a plurality of sidelink control information pieces (SCIs) including scheduling information of a positioning reference signal (PRS); receiving a plurality of PRSs based on the plurality of SCIs; detecting ambiguity of position measurement based on the plurality of PRSs, on the basis of positional relationship between the plurality of anchor nodes (ANs); requesting an angle of arrival (AoA) report from a single anchor node (AN) selected from among the plurality of anchor nodes (ANs) based on the detected ambiguity of position measurement; and measuring a position of the user equipment (UE) based on the plurality of PRSs and the reported AoA.

Advantageous Effects

Various embodiments of the present disclosure can provide a method and a device for quickly detecting Time Difference of Arrival (TDoA) positioning ambiguity through topology of anchor nodes in a broadcast TDoA positioning process, and quickly solving the TDoA positioning ambiguity caused by the topology of the anchor nodes through rapid execution of an angle of arrival (AoA) report requesting procedure based on the detected positioning ambiguity, thereby improving the accuracy of TDoA and minimizing a time required for TDoA execution.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
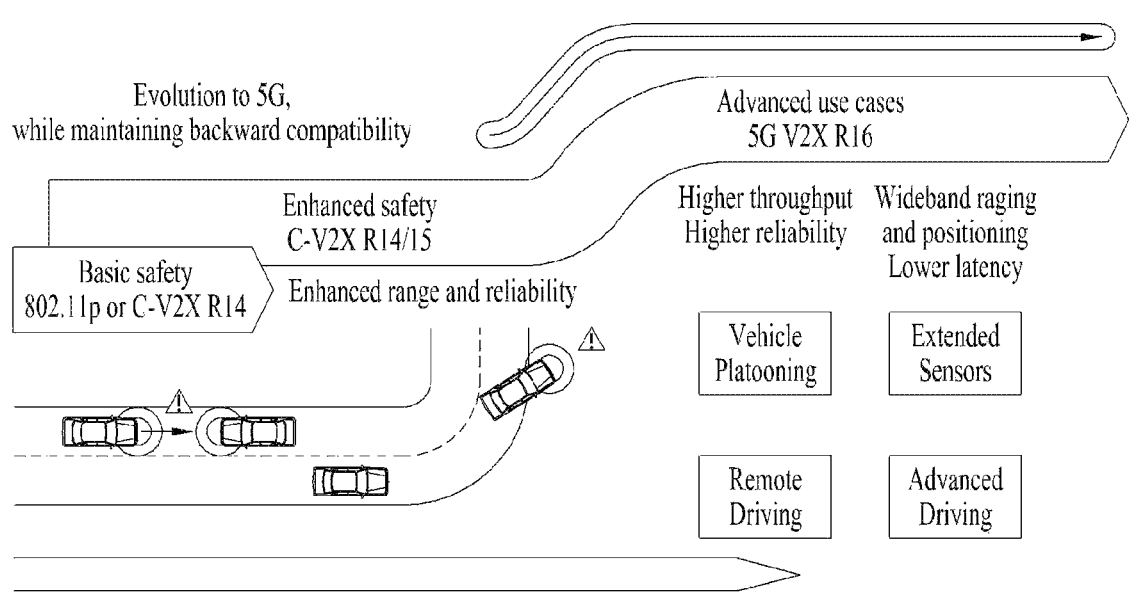
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
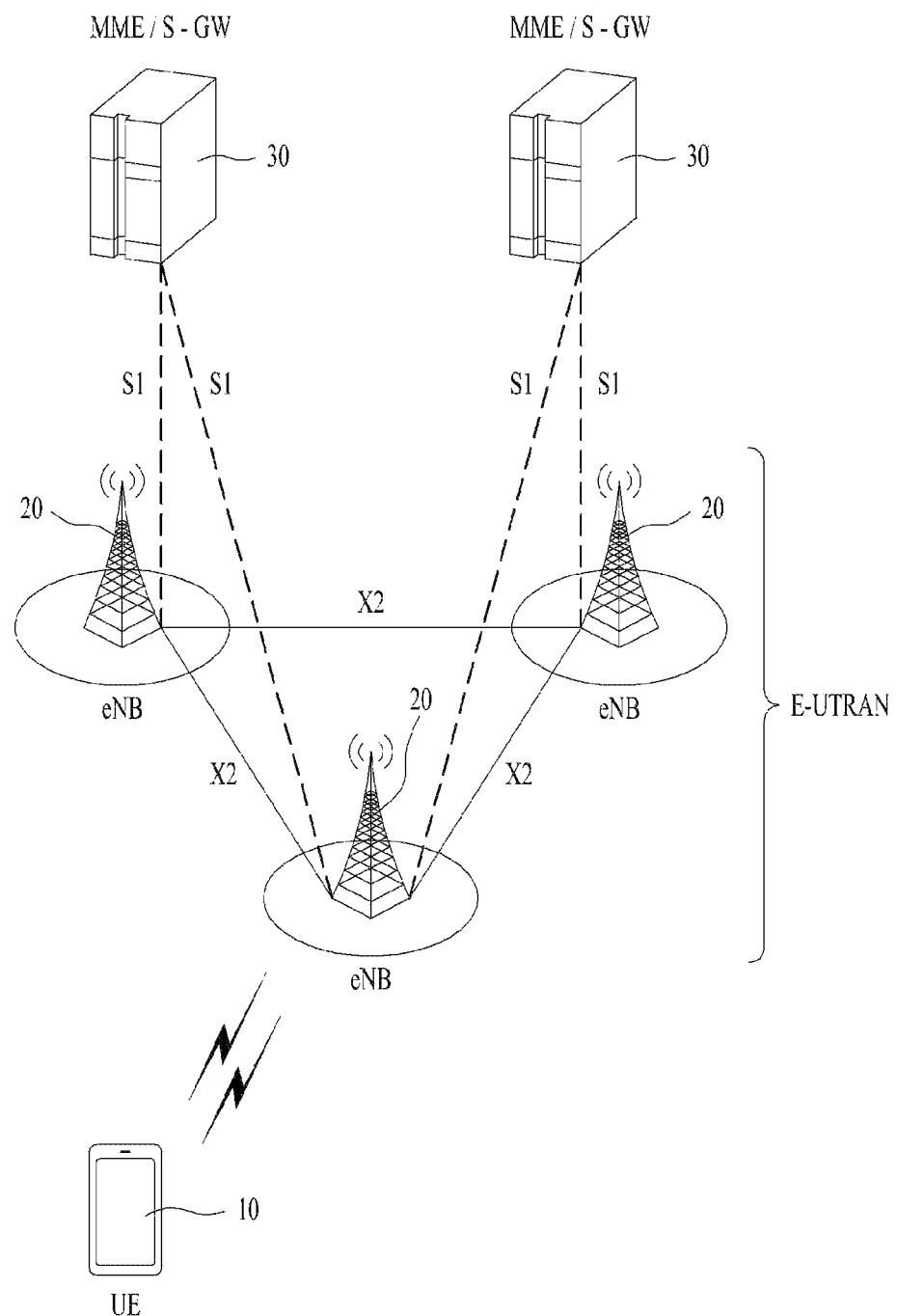
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user UE (UT), subscriber station (SS), mobile UE (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
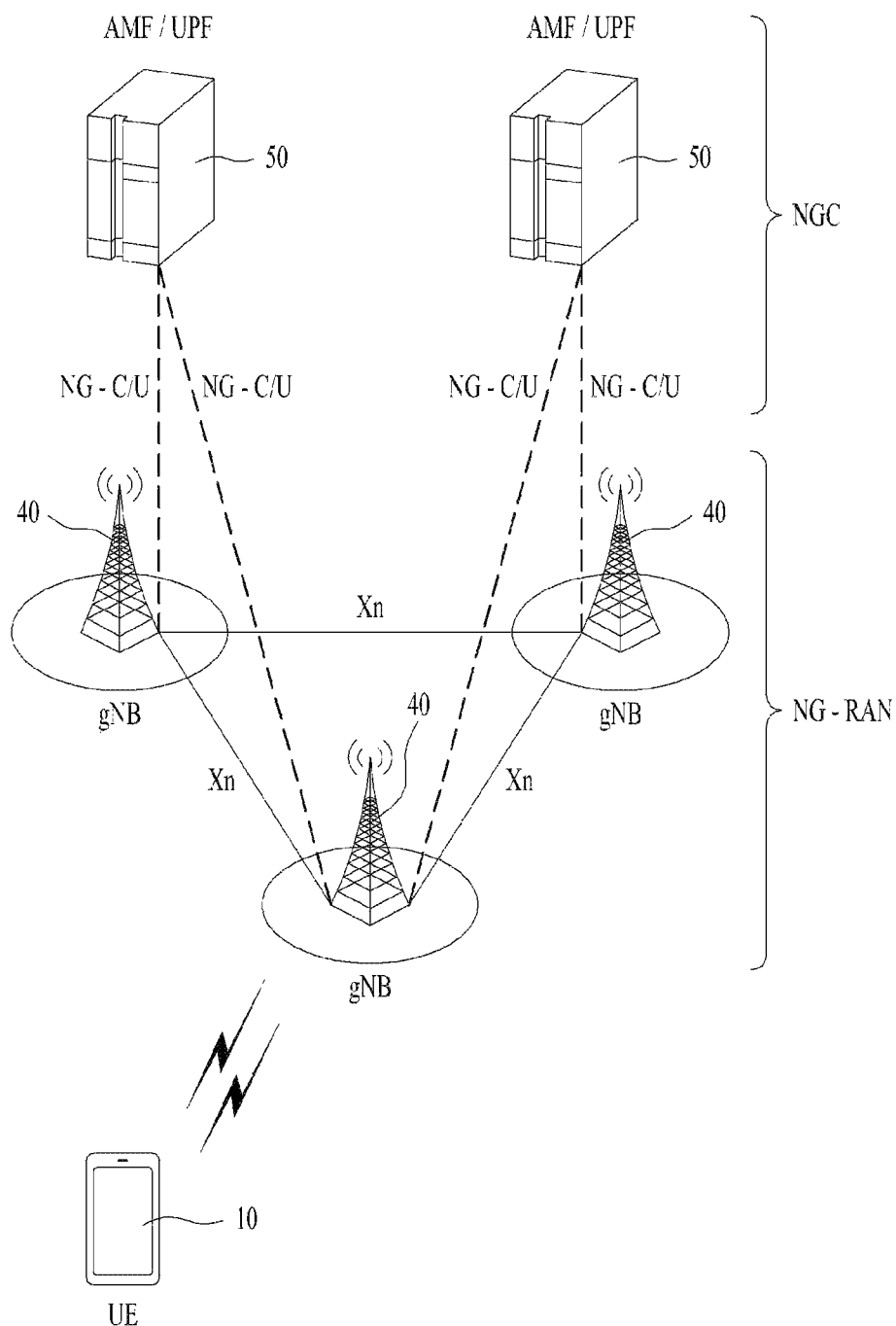
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
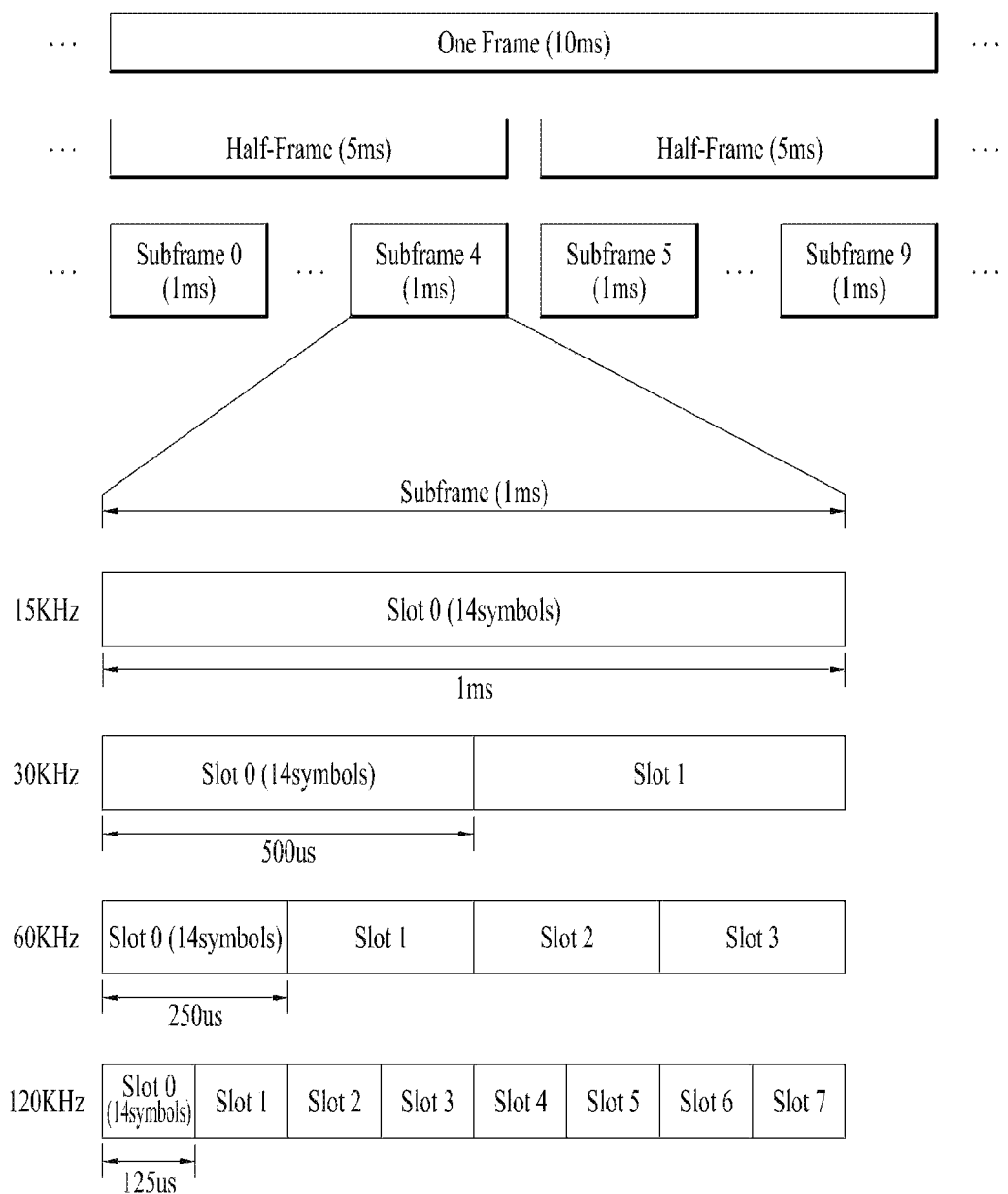
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration μ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
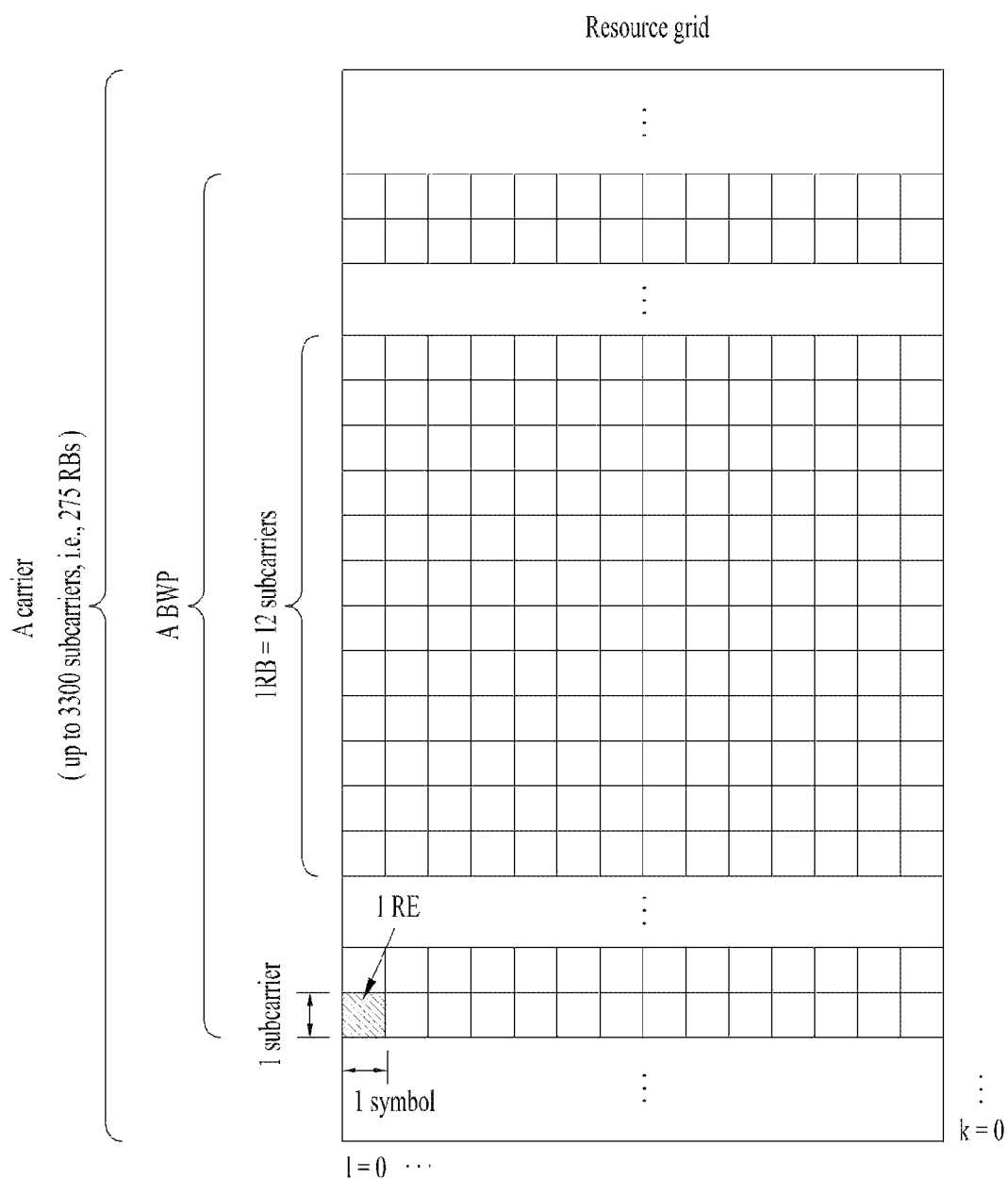
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
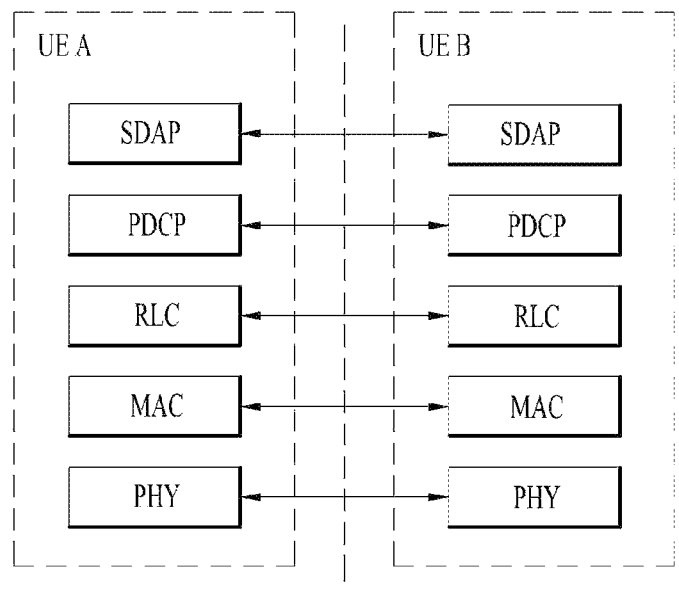
FIG. 6 illustrates a radio protocol architecture for SL communication.
Figure 6:
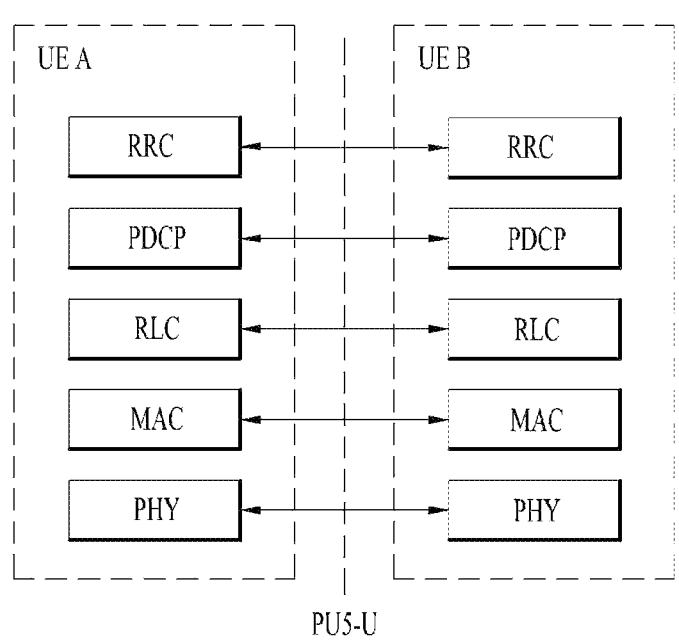

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
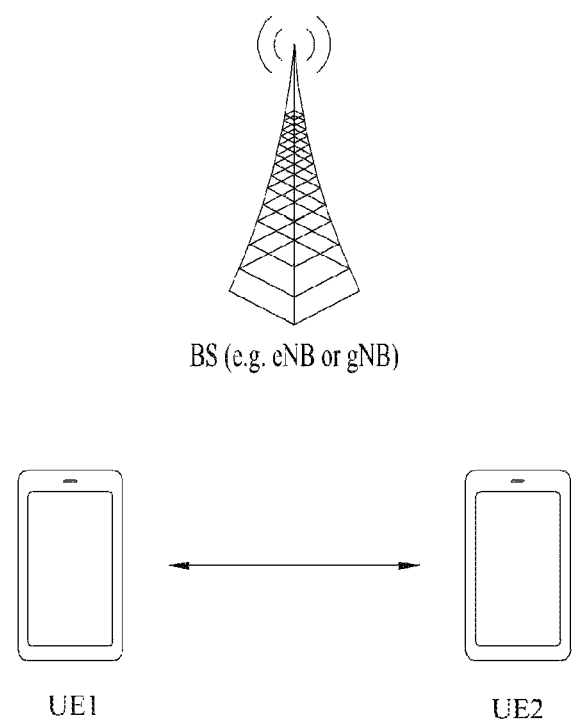
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
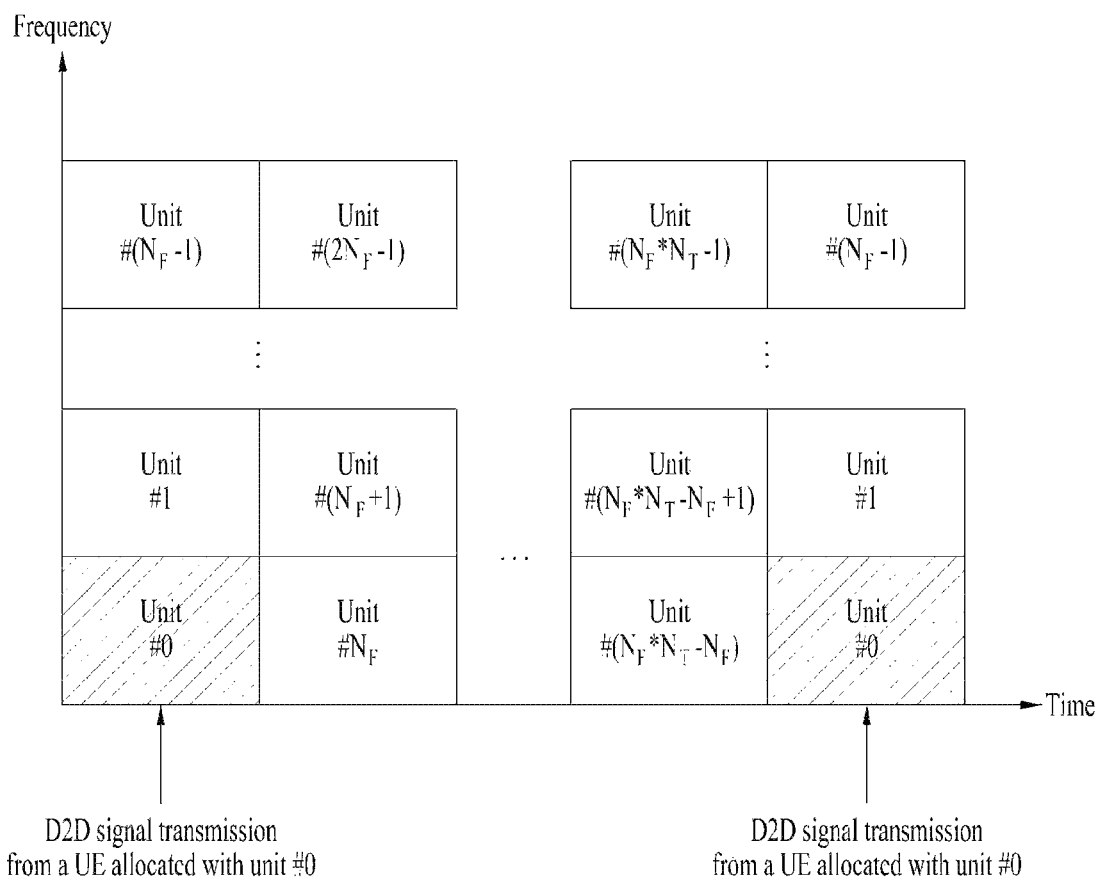
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
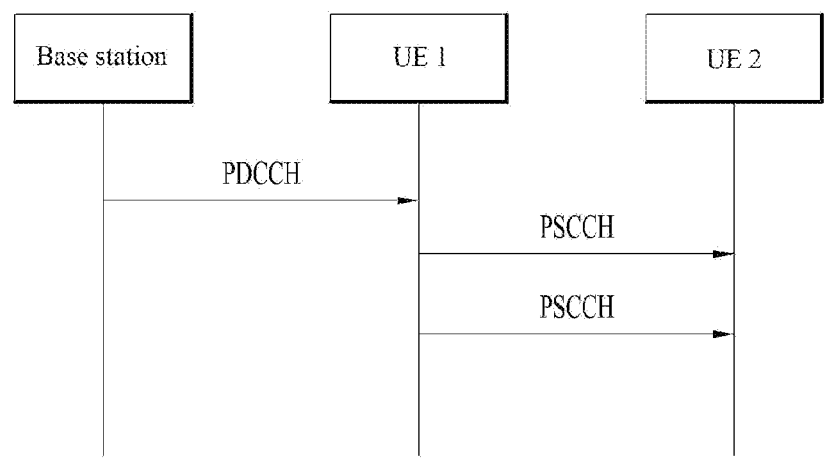
FIG. 9 illustrates a procedure in which UEs perform V2X or SL communication according to a transmission mode.
Figure 9:
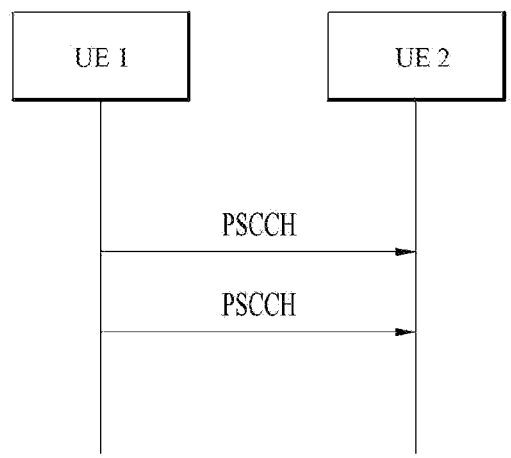

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(*a*) illustrates a UE operation related to LTE transmission mode 1 or LTE transmission mode 3. Alternatively, for example, FIG. 9-(*a*) illustrates a UE operation related to NR resource allocation mode 1. For example, LTE transmission mode 1 may be applied to general SL communication, and LTE transmission mode 3 may be applied to V2X communication.

For example, FIG. 9-(*b*) illustrates a UE operation related to LTE transmission mode 2 or LTE transmission mode 4. Alternatively, for example, FIG. 9-(*b*) illustrates a UE operation related to NR resource allocation mode 2.

Referring to FIG. 9-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packet related) QoS information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Figure 10:
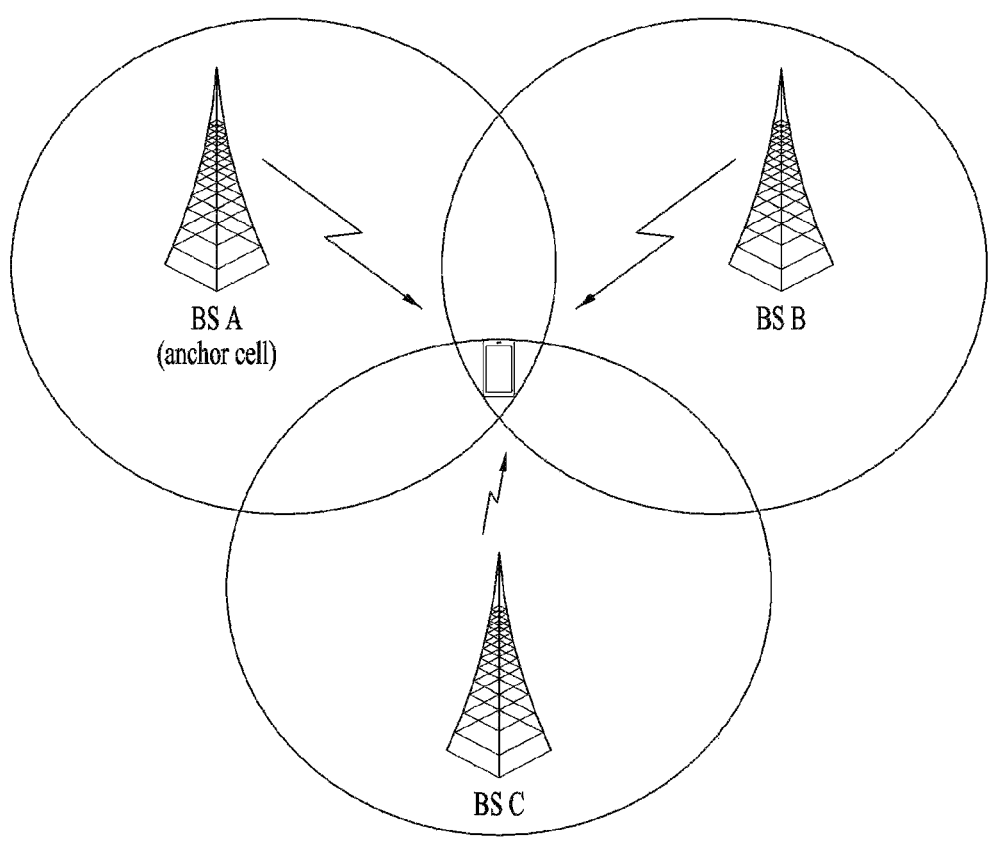
FIG. 10 is a diagram illustrating an Observed Time Difference Of Arrival (OTDOA) positioning method applicable to the present disclosure.

FIG. 10 is a diagram illustrating an Observed Time Difference Of Arrival (OTDOA) positioning method to which various embodiments are applicable.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from three or more geographically-distributed TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 1]

In Equation 1, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and $n_i$ and $n_1$ are UE ToA measurement error values.

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method may partially utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

UTDOA (Uplink Time Difference of Arrival): UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

The present disclosure proposes a method and a procedure for enabling the UE to effectively perform TDoA positioning (UE-based Sidelink TDoA) using a sidelink in an NR-V2X system. First, the present disclosure proposes a PRS (Positioning Reference Signal) transmission method for TDoA measurement in the legacy NR-V2X slot structure. In addition, the present disclosure proposes a method for enabling the UE to effectively perform 1) the broadcast TDoA mode and 2) the on-demand TDoA mode using the NR-V2X slot-based PRS transmission structure, and describes a procedure for performing each mode.

UE Based TDoA Positioning

The present disclosure relates to a method for measuring the position of a UE through transmission and reception of a sidelink signal by a UE and an AN in the NR-V2X system. In particular, the present disclosure relates to a method for enabling the UE to receive necessary information from the AN and perform positioning (or UE positioning). Here, the UE may be a mobile device, a V2X module, or an IoT device, and the AN may be a base station (BS) and/or a UE. In this case, the BS (or a neighboring BS) serving as the AN may include an eNB, a gNB, an LTE-LAA, an NR-U, a TP (Transmission point), a Remote Head Control (RHC), and a gNB-type RSU (Road-Side Unit) capable of providing fixed (or absolute) location information. On the other hand, the UE serving as the AN may include a UE capable of providing high-reliability location information, and a UE-type RSU capable of providing fixed location information.

The UE positioning based on OTDoA (Observed TDoA) of the NR system may allow the location server/LMF and/or BS (or a network) to request measurement and reporting of RSTD information required for OTDoA positioning from the UE through the Uu interface. Thereafter, the UE position is measured by the network using the received RSTD, and the measured UE position is re-transmitted to the UE. The UE positioning method based on the network can finally reduce the reliability of information related to positioning by finally causing a large delay until the UE receives location information. In particular, the physical delay generated in such positioning operation can significantly reduce reliability of the information in proportion to the increasing UE speed in the NR-V2X system. Therefore, in order to solve the above-described problems, the present disclosure provides a method for enabling the UE to directly perform its own positioning by receiving assistance of neighboring ANs (or AN groups).

The method for performing positioning by the UE (or the positioning UE) may include a broadcast TDoA positioning method by the positioning UE for use in the sidelink NR-V2X slot structure, and an on-demand TDoA positioning method for enabling the positioning UE to perform PRS transmission and management required for such positioning for use in the sidelink NR-V2X slot structure. Hereinafter, a PRS pool through which the PRS is transmitted and the NR-V2X slot structure of the PRS pool will be described with priority.

Figure 11:
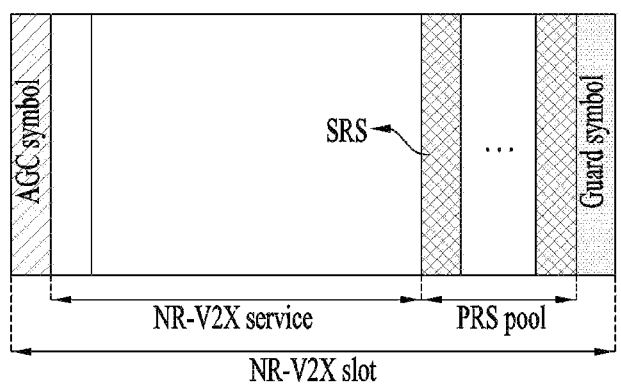
FIG. 11 is a diagram illustrating a method for transmitting a PRS using an NR-V2X slot structure.
Figure 11:
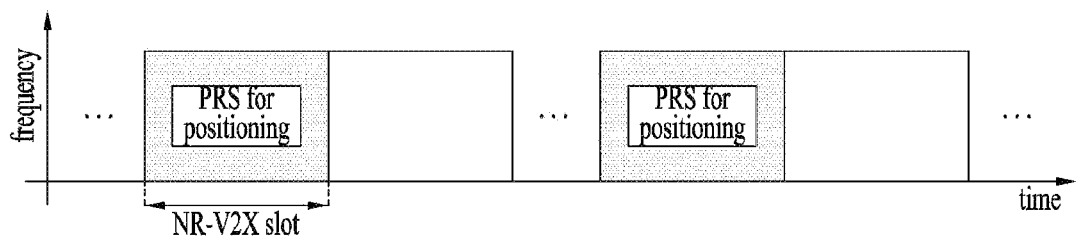

FIG. 11 is a diagram illustrating a method for transmitting a PRS using an NR-V2X slot structure.

Referring to FIG. 11(a), the PRS may be transmitted in a PRS pool in the NR-V2X slot structure. The PRS pool may correspond to a resource pool through which SRS is transmitted in the legacy NR-V2X system. Alternatively, referring to FIG. 11 (b), the PRS may be transmitted through a periodically allocated (or designated, allocated) NR-V2X slot.

In other words, the PRS may be transmitted using the NR-V2X slot structure, and the PRS may be transmitted using a resource in which a sound reference signal (SRS) (or an RS corresponding to the SRS) can be transmitted in the legacy NR-V2X slot structure or can be transmitted using a resource of a newly designated specific NR-V2X slot. In this case, the NR-V2X slot to which the PRS is transmitted may be periodically or aperiodically arranged (or allocated). Alternatively, the PRS may be transmitted through a combination of the two methods described above.

When the PRS is transmitted in the PRS pool (FIG. 11(a)), the PRS may be transmitted using the legacy comb-type SRS or may be distributed and transmitted similarly to a PRS transmitted in NR positioning. In this case, PRS transmission using the SRS may serve as broadband (wideband) transmission, and may use RB resources of the predefined NR-V2X slot. Also, when the PRS is transmitted using a distributed PRS pattern such as NR positioning, the PRS can be processed in broadband transmission and narrowband transmission. In this case, a frequency bandwidth can be adjusted by flexibly configuring the plurality of RBs. The frequency bandwidth for the aforementioned PRS transmission may be predefined or determined by the network (location server, LMF and/or BS) and transmitted to the positioning UE or ANs.

Alternatively, information related to both the number of OFDM symbols that can be used for PRS transmission in the PRS pool and the number of different PRS patterns that can be transmitted at the same time may be determined by a network (location server, LMF and/or BS), so that the determined information can be provided to the positioning UE or the ANs or can be predefined.

In the NR-V2X slot in which the PRS shown in FIG. 11(b) is transmitted, a plurality of NR-V2X slots may be continuously arranged (or designated) or used according to the TDoA positioning operation method and the NR-V2X system operation method. In this case, the respective NR-V2X slots may repeatedly have the same PRS information or may have different types of PRS information. The configuration information (e.g., the location of NR-V2X slot, the number of consecutive NR-V2X slots, etc.) of the NR-V2X slot through which the PRS is transmitted may be predefined, or may be determined by the network (location server, LMF and/or BS), so that the determined information can be transmitted to the positioning UE or ANs.

Hereinafter, a method for performing TDoA positioning based on the NR-V2X slot in which the defined PRS is transmitted according to the concept of FIG. 11 will be described.

The PRS transmitted through the NR-V2X slot can be operated differently according to TDoA positioning methods. For example, the broadcast TDoA positioning method may be performed by an AN in the PRS pool, and the on-demand TDoA positioning method may be performed by the positioning UE in the PRS pool.

The broadcast TDoA positioning may allow the An to periodically broadcast an SCI and/or PRS required for TDoA positioning in the positioning UE. The positioning UE may perform TDoA positioning based on the periodically received PSCCH information (including the SCI) and/or PRS.

In this case, the SCI or PSCCH information may be transmitted by the AN in NR-V2X service resources rather than PRS pool resources described with reference to FIGS. 11(a) and/or 11(b), and the PRS may be transmitted by the AN in the PRS pool (or in the resource of the PRS pool scheduled according to the SCI). Here, the SCI may include location information of the AN, PQI information, PRS scheduling information (e.g., a PRS pattern, a PRS transmission position, a PRS pattern retention time, etc.), and PRS reservation information. The SCI may be periodically or aperiodically broadcast in consideration of the NR-V2X slot arrangement.

The AN may perform a pre-reservation procedure for the use of the PRS pool required for PRS transmission. Specifically, in V2X mode-1, the AN may receive information on the PRS pattern and PRS position determined by the network (location server, LMF and/or BS), and may perform transmission of the PRS based on the received PRS pattern and PRS position. In V2X mode-2, the AN may sense an SCI received from the surrounding vehicle, may detect a PRS pattern and a PRS position that are not used in another AN and are not scheduled to be used in another AN, and may perform a pre-reservation procedure for the detected PRS pattern and the detected PRS position. In addition, the AN may transmit either information on the PRS pattern and PRS position determined by the network or information on the detected PRS pattern and PRS position to the positioning UE as SCI.

In the on-demand TDoA positioning method, the positioning UE may provide the surrounding ANs (or candidate ANs) with information required for positioning while requesting the positioning UE to participate in the positioning process, and may perform TDoA positioning through assistance of the AN group composed of one or more ANs finally accepted to participate in the on-demand positioning. In this case, each AN of the AN group my transmit an SCI required for TDoA positioning of the positioning UE, and the SCI can be transmitted in the PRS pool resource and a separate NR-V2X service resource. In addition, the SCI may be provided to the positioning UE in the AN group selection process to be performed before the positioning UE transmits the PRS. In addition, the SCI may be updated by retransmitting the ToA measured in the AN group to the positioning UE.

The positioning UE may transmit the PRS to the AN group in a PRS pool affected by the SCI received from the AN group. The positioning UE may receive ToA information measured in the AN group. Here, the AN group may be transmitted through a PSCCH and/or a PSSCH using a PRS pool resource and a separate NR-V2X service resource for ToA provision. In other words, the positioning UE may transmit the PRS in a resource scheduled in the PRS pool based on the SCI received from the AN group. In this case, the AN group may provide the positioning UE with the measured ToA information through a PSCCH and/or a PSSCH in the PRS pool resource and a separate NR-V2X service resource.

On the other hand, the positioning UE may perform a pre-reservation procedure for PRS transmission in the PRS pool resource. In this case, the pre-reservation procedure related to the PRS may be mainly performed by a first method (1) in which the PRS pattern and the PRS position are determined by the network (location server, LMF and/or BS) corresponding to V2X mode-1 and transmitted to the positioning UE, and by a second method (2) in which reservation of a PRS pattern and PRS position (that are not used by another positioning UE or are not scheduled to be used in another positioning UE) is performed after sensing the SCI received from the surrounding vehicle in V2X mode-2.

In other words, the positioning UE may select the resource for PRS transmission within the PRS pool based on the PRS pattern and PRS position determined by the network (location server, LMF and/or BS), or may select or pre-reserve other resources that are not used or are not scheduled to be used according to the SCI received from the surrounding vehicle, the surrounding UE, or the surrounding AN.

As described above, when pre-reservation for the resource for PRS transmission is completed, the positioning UE may transmit scheduling information or SCI related to the reserved PRS to a group AN. Execution of a pre-reservation procedure of a resource required for PRS transmission and transmission of the scheduling information may be completed before the NR-V2X slot for the PRS transmission begins.

Hereinafter, detailed procedures of the broadcast TDoA positioning and the on-demand TDoA positioning will be described in detail.

Figure 12:
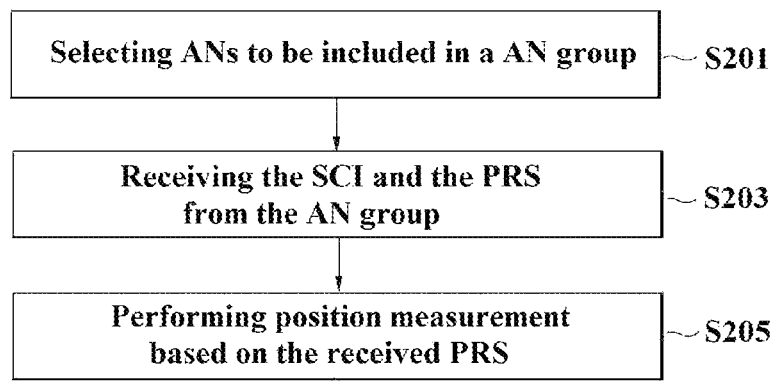
FIG. 12 is a diagram illustrating a method for performing broadcast TDoA positioning.

FIG. 12 is a diagram illustrating a method for performing broadcast TDoA positioning.

Referring to FIG. 12, the plurality of ANs may construct the AN group (or at least one final AN) scheduled to participate in TDoA of the positioning UE through the following processes (S201). Prior to configuration of the AN group, each BS and/or each UE, each of which is capable of operating as the AN, may determine in advance whether the BS and/or the UE is a candidate AN capable of participating in positioning of the positioning UE. Here, the candidate AN may refer to a candidate BS and/or candidate UE capable of transmitting the PRS in the PRS pool of the NR-V2X slot, and the AN group (or the final AN) may be defined as ANs that actually participate in TDoA measurement of the positioning UE from among the candidate ANs.

Specifically, each BS and/or each UE may determine whether to participate in TDoA positioning while acting as a candidate AN based on the PQI for location information. For example, each BS and/or each UE, each of which can operate as the AN, may operate as a candidate AN when the measured PQI is higher than a specific threshold. In contrast, each BS and/or each UE may not operate as a candidate AN when the measured PQI is less than the specific threshold. Here, the specific threshold may be predefined, or may be determined by the network (a location server (LMF) and/or a BS), so that the resultant specific threshold can be transmitted to the BS and/or UE.

Alternatively, candidate ANs may be determined by the network (location server, (LMF) and/or a BS). Specifically, when a specific UE is determined to be a candidate AN, the network (location server, LMF and/or a BS) can determine whether the specific UE participates on TDoA positioning while operating as a candidate AN based on the location information or PQI reported from the UE. In this case, the specific UE may periodically report location information or PQI information to the network (location server (LMF) and/or a BS), or may periodically report such location information or PQI information to the network upon receiving a request from the network (location server and/or a BS). On the other hand, the base station (BS) and/or the UE (having fixed location information) may not perform separate location information and/or PQI reporting as needed.

Alternatively, the candidate AN may be pre-configured or pre-determined. That is, at least one of the plurality of BSs and/or UEs may be pre-determined to be a candidate AN without determining the above-described PQI. For example, a BS and/or a UE (having fixed location information) from among the plurality of BSs and/or UEs can always operate as a candidate AN regardless of the PQI.

The candidate ANs may be determined or selected as an AN group or a final AN capable of participating in TDoA of the positioning UE by the following procedure. Specifically, the AN group (final AN) may be selected or determined through a sensing and/or competition process between candidate ANs. Specifically, the AN group may include a candidate AN that has successfully selected and reserved resources related to PRS transmission from among the candidate ANs.

For example, each of the candidate ANs may sense an SCI that is periodically or aperiodically transmitted, and the AN group may be selected or determined to be at least one AN that has not been used by another AN (or another candidate AN) from among the candidate ANs or has successfully selected and reserved a PRS pattern, a PRS position, a PRS valid time, etc. that are not scheduled to be used by another AN (or another candidate AN).

Alternatively, the AN group may be at least one AN selected from among the candidate ANs by the network. When the UE (determined to be a candidate AN) is considered as the final AN, the network can provide the UE with information about whether the final AN is decided and PRS scheduling information (such as a PRS pattern, a PRS location, a PRS valid time, etc. to be used in the PRS pool).

Alternatively, the AN group may be pre-determined and pre-configured from among the candidate ANs in consideration of a road network configuration or a network coverage. For example, an AN included in the AN group may be pre-configured for each zone (or for each region). The above-described method may not require a PRS scheduling information reservation process through sensing between ANs, thereby providing fast positioning.

The selected or determined AN group may periodically or aperiodically broadcast SCI (sidelink control information) and PRS required for TDoA positioning through the NR-V2X slot. The SCI or PSCCH (including the SCI) may include location information of the AN group, PQI (positioning quality information), PRS scheduling information (such as a PRS pattern and PRS transmission location, a PRS pattern retention time, etc.), PRS reservation information, and the like.

Meanwhile, in relation to the location information of the AN group, when an AN included in the AN group is a UE, the AN acting as the UE may periodically or aperiodically update location information (or location information thereof) using the PSCCH information and the PRS received from the surrounding AN. Alternatively, when the AN included in the AN group is a base station (BS), the AN may adjust an SCI and PRS provision period using the PQI received from another UE performing an AN role. Here, periodic or aperiodic SCI and PRS provision according to the broadcast TDoA positioning can be determined in consideration of the surrounding traffic environment related to ANs and/or the mobility information (e.g., speed) of the ANs. Meanwhile, the mobility information of the AN can be utilized when the AN is a UE.

The AN group may transmit the SCI and the PRS through the PSCCH and/or PSSCH of the same NR-V2X slot or may transmit the SCI and the PRS through different NR-V2X slots. Here, when the AN group transmits SCI in the PSSCH, the SCI may be piggybacked to the PSSCH (i.e., 2nd SCI format).

In addition, the AN group may transmit the PRS at the OFDM symbol position where the PRS is transmitted, based on the predefined number of OFDM symbols for the PRS. Alternatively, the AN group may transmit the PRS based on the number of OFDM symbols for the PRS determined by the network and the OFDM symbol position at which the PRS is transmitted.

Meanwhile, when the AN group (and/or the positioning UE) exists within the coverage of the network, the AN group (and/or the positioning UE) can obtain information related to the PRS pool structure and the broadcast TDoA positioning operation through MIB/SIB of the PSBCH of the network. In this case, the information related to the PRS pool structure and the broadcast TDoA positioning operation can be periodically or aperiodically changed or updated by the network. Alternatively, when the AN group is located outside the network coverage or performs TDoA positioning without assistance of the network, the AN group can pre-configure a specific operation in which the information related to the PRS pool structure and the TDoA positioning operation are associated with default TDoA positioning.

Hereinafter, specific procedures for measuring broadcast TDoA through the AN group will be described in detail.

The positioning UE may receive an SCI from at least one AN included in the AN group, and may receive the PRS transmitted from the PRS pool based on the SCI (S203). The positioning UE may receive an SCI required for the TDoA positioning from the AN group in a PRS pool and a separate NR-V2X service resource, and may receive the PRS in the PRS pool. Here, the SCI may include location information of the final AN, PQI for location information, reserved PRS pattern and location information, information related to PRS reservation time, and the like.

In addition, the PQI for the location information may be a basis for the positioning UE to determine whether to participate in TDoA by selecting only some ANs from among ANs included in the AN group. For example, in the case of a Location Based Service (LBS) that requires very high positioning accuracy, the positioning UE can allow only an AN, which has a PQI higher than a predetermined threshold (or a threshold pre-configured for the LBS) in the AN group, to be used for TDoA positioning. In this case, the predetermined threshold may be defined differently according to LBSs, and the preconfigured threshold corresponding to the LBS may be determined by the network, so that they can be provided to the BS and/or the UE. In addition, information related to the TDoA slot period of the AN group may indicate a time of the next TDoA slot and information about whether or not the TDoA slot is used.

Next, the positioning UE may perform TDoA measurement and TDoA positioning based on the SCI and PRS received from the AN group (S205). Specifically, based on a difference in two TDoA values measured by one pair of ANs (included in the AN group) and location information of each of the two ANs included in the pair of ANs, the positioning UE may draw a hyperbolic curve focusing on the two positions, may draw another hyperbolic curve based on another pair of two TDoA values, and may calculate coordinates of an intersection of the two hyperbolic curves, so that the location of the positioning UE can be measured. Alternatively, the positioning UE may perform TDoA positioning using location information of the final AN and/or weight information for each final AN. In this case, the position of the measured positioning UE may be corrected by applying a weight for each final AN.

Figure 13:
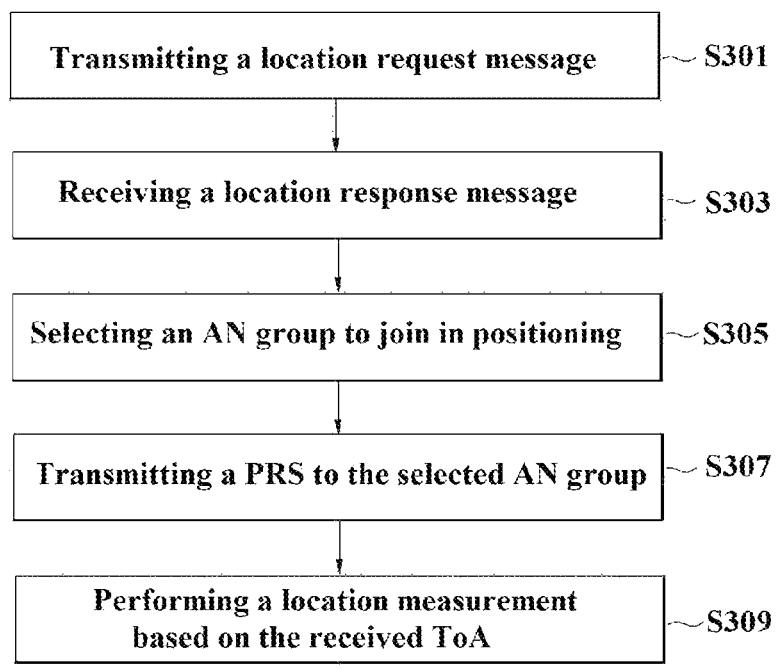
FIG. 13 is a flowchart illustrating a method for performing on-demand TDoA positioning.

FIG. 13 is a flowchart illustrating a method for performing on-demand TDoA positioning.

According to the on-demand TDoA positioning method, the positioning UE may transmit a PRS to the AN group, and the AN group may provide the positioning UE with TDoA information measured based on the received PRS. In this case, the positioning UE may receive SCI information for PRS transmission from the AN group in advance. In other words, during the process of selecting the AN group, the positioning UE may receive SCI information corresponding to the scheduling information related to PRS transmission, and may transmit the corresponding PRS to the AN group based on the received SCI information.

The SCI (or information about the SCI) provided from the AN group to the positioning UE (or information on the SCI) may be updated by re-transmitting the TOA measured by the AN group to the positioning UE. In other words, the positioning UE may receive information about the SCI updated by the AN groups upon receiving TOA from the AN group, and may transmit the PRS according to the scheduling information of the PRS included in the information on the updated SCI. In this case, SCI may include location information of the AN, PQI information, PRS scheduling information. PRS reservation information, etc.

In this case, the SCI and the PRS may be transmitted through a PSCCH and/or a PSSCH of the same NR-V2X slot, or may be transmitted through different NR-V2X slots. Here, the SCI may be piggybacked on the PSSCH ($2^{nd}$ SCI format).

Meanwhile, when the AN included in the AN group is a UE, the AN can update location information (location information of the AN) using SCI and PRS received from the surrounding AN. Alternatively, the AN may update the SCI based on the updated location information, and may provide the positioning UE with information on the updated SCI when reporting the measured TOA.

In addition, similar to the broadcast TDoA positioning, the positioning UE and the AN may be present within the network coverage, and the network may provide the positioning UE and the ANs with information about the PRS pool structure and the broadcast TDoA positioning operation through the MIB/SIB of the PSBCH. The information about the PRS pool structure and the broadcast TDoA positioning operation may be periodically or aperiodically changed or updated by the network.

Referring to FIG. 13, the positioning UE may transmit a request message for positioning to a plurality of ANs so as to request the plurality of ANs to participate in the on-demand positioning process (S301). The positioning UE may request on-demand positioning participation through a high layer sidelink positioning protocol (SPP) message on a Control Plane or a User Plane, or information about the on-demand positioning participation may be signaled through PSCCH, PSSCH, PC5 RRC, and/or MAC CE.

Next, the positioning UE may receive a positioning response message responding to a measurement request message from at least one candidate AN included in the plurality of ANs (S303). Here, the at least one candidate AN may be an AN having a PQI greater than (or higher) a requested PQI threshold (or a requested PQI level) included in a requested PQI message included in the positioning request message. Alternatively, the AN having a PQI less than the requested PQI threshold (or a requested PQI level) may not transmit the positioning response message, or may transmit a positioning response message rejecting positioning participation.

Alternatively, the at least one candidate AN may be determined based on the quality of a link to the positioning UE. For example, the at least one candidate AN may be an AN for receiving a signal in which a reference signal received power (RSRP) for DMRS has a specific threshold or greater, or may be an AN for receiving a PSCCH and/or PSCCH in which a received signal strength indicator (RSSI) has a specific threshold or greater. At this time, a specific threshold or a reference level for PQI, RSRP, and RSSI can be pre-defined according to LBS (or regardless of LBS), or may be determined by the network (location server, LMF and/or BS). Alternatively, the at least one candidate AN may be an AN selected (or pre-selected) by the network (location server/LMF and/or BS).

Alternatively, the at least one candidate AN may be pre-determined and pre-configured in consideration of the road network configuration or the network coverage. For example, when the BS is considered as the at least one candidate AN, a base station (BS) pre-configured in a region or section including the positioning UE may serve as at least one candidate AN and at the same time may always transmit the positioning response message (accepting participation). That is, the BS pre-configured as the at least one candidate AN in a specific road network configuration or a specific coverage can automatically participate in the positioning of the positioning UE upon receiving an on-demand positioning participation request message from the positioning UE, such that the pre-configured BS can measure and report ToA. The above pre-configuration method need not perform a specific process in which the surrounding AN to be described later accepts/rejects participation in the positioning process and the positioning UE selects the plurality of ANs, resulting in implementation of fast positioning.

In this case, the positioning response message for acceptance or rejection of the positioning request message of the candidate AN may be received via the SPP request message, or may be signaled via a PSCCH, PSSCH, PC5 RRC, and/or MAC CE. On the other hand, the positioning UE may receive, from each of the plurality of ANs, an SCI including location information for each AN and PQI information, etc.

Next, the positioning UE may determine which candidate AN (or which BS and/or UE) will participate in the positioning as the AN group based on the positioning response message received from the at least one candidate AN (S305). Alternatively, the positioning UE may select a candidate AN capable of optimizing positioning performance using the obtained candidate AN position information, and may determine the selected candidate AN of the AN group to be the final AN. For example, upon receiving location information obtained from each of the candidate ANs, the positioning UE may select one or more candidate ANs arranged in an arrangement format having a high accuracy of TDoA-based position estimation from among the candidate ANs, and may determine the selected candidate ANs to be the AN group.

Alternatively, when the number of ANs capable of participating in the on-demand positioning process is limited, the positioning UE may perform ranking of the limited number of ANs in consideration of PQI information, RSSI (or RSSI information), topology information, and the like, and may enable the ANs to be sequentially selected from the higher-priority AN to the lower-priority AN within the AN group. At this time, the number of ANs included in the AN group capable of participating in the on-demand positioning process may be predefined according to the LBS (or regardless of LBS) or may be determined by the network, such that the resultant number of ANs can be transmitted to the BS and the UE (or AN and the positioning UE). That is, the number of ANs included in the AN group can be set differently according to the type of service, QoS of the service, and a road area. In other words, the maximum number of ANs capable of being selected from among the candidate ANs by the positioning UE can be set differently according to the service type, the service QoS, and the road area.

Alternatively, the candidate AN to be included in the AN group may be selected by network determination. For example, the network may be pre-configured to always be included in the AN group for a candidate AN having fixed location information. Alternatively, the positioning UE may preferentially select an AN (BS and/or UE) having a fixed position from among the candidate ANs or from among the ANs capable of participating in positioning, and may determine the selected AN to be the AN of the AN group.

When the AN group scheduled to participate in TDoA is selected, the positioning UE can perform the PRS reservation procedure for reserving resources to be used for PRS transmission to the ANs included in the AN group. Alternatively, the positioning UE may select or reserve transmission (Tx) resources (PRS pattern. PRS transmission position and/or PRS valid time) required for PRS transmission in the PRS pool.

Specifically, the positioning UE may select or reserve a PRS pattern, a PRS transmission position, and a PRS valid time (or PRS scheduling information) for PRS transmission through a sensing and/or contention process with another positioning UE. For example, the positioning UE may periodically or aperiodically sense the SCI of the surrounding UEs (or neighboring UEs), and may select and reserve, based on the sensing result, a PRS pattern, a PRS transmission location, a PRS valid time, etc. that are not used or are not scheduled to be used by another positioning UE. On the other hand, in relation to the PRS pattern and the PRS transmission location that are used by the other positioning UE or scheduled to be used by the other positioning UE based on the SCI of the other positioning UE, the positioning UE may not select and reserve the PRS pattern and the PRS transmission position as transmission (Tx) resources for PRS transmission.

The positioning UE may transmit the scheduling information (PRS reservation information) and the PRS to the AN group (S307). The PRS reservation information or the scheduling information transmitted to the AN group may be transmitted through an SPP message or may be signaled through a PSCCH, a PSSCH, a PC5 RRC, and/or a MAC CE. The positioning UE may transmit the PRS to the AN group according to the scheduling information after transmission of the scheduling information, and may receive a report about information on the ToA measured based on the PRS from the AN group. On the other hand, when the positioning UE receives the report about the measured ToA, the positioning UE may also receive location information and PQI for each AN group through a PSCCH and/or a PSSCH.

The positioning UE may measure the TDoA using a TDoA value received from the AN group, and may estimate a position thereof in a similar way to the position estimation method described in the above-described broadcast TDoA operation (S903).

By performing positioning through the above-described method, the positioning UE can directly perform TDoA positioning using a sidelink without assistance of the network (location server, LMF and/or BS). In this case, the positioning UE may measure the position thereof more quickly than the existing positioning method by minimizing exchange of signals required for location estimation with the network. In addition, the positioning UE may use a predetermined resource of the legacy NR-V2X slot as the PRS pool for PRS transmission so as to efficiently execute the TDoA positioning, and can maintain backward compatibility with the legacy NR-V2X by transmitting the SCI required for the UE positioning through a PSCCH and/or PSSCH of the NR-V2X slot. Furthermore, in a situation where not only PRS scheduling information (e.g., a PRS pattern, a PRS position, a PRS valid time, etc.) to be used by the BS as an anchor node (AN) according to the region or section, but also a plurality of ANs scheduled to participate in positioning of the positioning UE are configured in advance, the positioning UE can perform its own positioning more quickly.

UE Based TDoA Positioning Using AoA

On the other hand, when the ANs having transmitted the PRSs are arranged in a line or the ANs are arranged to be biased in a specific direction from the viewpoint of the positioning UE, the positioning UE may cause positioning ambiguity due to an arrangement structure of the ANs (i.e., AN topology). For example, the positioning UE may estimate two or more positions based on TDoA caused by the AN topology, so that it may be difficult for the positioning UE to accurately estimate the position thereof. Therefore, it is necessary for the positioning UE to perform the procedure of requesting the AoA measurement and reporting (to be described later) after sensing the positioning ambiguity, so that the positioning UE has to eliminate such positioning ambiguity caused by the AN topology.

Specifically, when positioning ambiguity is detected based on a positional relationship of the ANs included in the AN group, the AoA measurement and reporting can be requested for any one from among the ANs. For example, one of the plurality of ANs participating in such positioning may be selected and the PRS for AoA measurement can be transmitted in the PRS pool pre-allocated to the selected one AN.

At this time, the selection of the PRS to be transmitted in the PRS pool can be performed through a PRS LBT (Listen Before Transmit) process or a pre-reservation process. The AN can operate to automatically respond to the PRS received from the UE. When the received PRS corresponds to a previously allocated PRS pool, the AN may measure the AoA using multiple antennas and transmit the measured AoA together with a UE ID and/or PRS ID to the UE. In other words, upon receiving the PRS in the PRS pool corresponding to the AN, the AN may measure the AoA based on the received PRS, and may transmit the measured AoA together with the corresponding PRS ID or UE ID.

As such, through PRS transmission (or PRS reception) within the PRS pool pre-configured to correspond to the AN, the UE and the AN can perform measurement and reporting of the AoA without accepting the procedure for requesting AoA measurement. In this case, the broadcast TDoA positioning process can be performed faster than in the prior art. In other words, since the PRS pool is pre-configured for each AN, the UE may transmit the PRS in the PRS pool corresponding to the AN scheduled to report the AoA, so that the UE can receive a report about the AoA measurement value capable of rapidly resolving the positioning ambiguity without execution of the additional response procedure and the AN specific procedure.

Specifically, the positioning UE may request the AoA measurement and reporting from the AN through the following procedure. When the positioning UE requests the AoA measurement and reporting, the positioning UE can transmit the PRS to the AN using the PRS pool structure in the NR-V2X slot described in FIG. 11.

For example, when the positioning UE and the AN are included in a coverage of the network (location server, LMF and/or a BS), the positioning UE and the AN may receive, from the network, information about a PRS pool structure for use in the NR-V2X slot described in FIG. 11, a PRS pool structure allocated to each UE, and information related to the pre-configured AoA measurement and reporting method, as NR-V2X system configuration information. The above-described information may be provided through MIB/SIB of the PSBCH, and may be periodically or aperiodically changed or updated by the network (location server, LMF and/or a BS).

Alternatively, when the positioning UE and the AN are located outside the coverage of the network (location server, LMF and/or BS) or have to perform broadcast TDoA positioning without assistance of the network (location server, LMF and/or BS), the PRS scheduling and/or PRS transmission/reception can be performed based on information related to the PRS pool structure allocated to each AN, and the pre-configured AoA measurement and reporting method. PRS scheduling and/or transmission/reception may be performed in the NR-V2X slot based on information related to a PRS pool structure, a PRS pool structure allocated to each AN, and a pre-configured AoA measurement and reporting method. In other words, information about the PRS pool structure in the NR-V2X slot, the PRS pool structure allocated to each AN, and the pre-configured AoA measurement and reporting method may be pre-configured and then provided.

The PRS pool-related configuration information allocated to each AN can be provided in advance to the positioning UE through a PSCCH in the broadcast TDoA positioning process. In other words, the positioning UE can acquire information about the PRS pool corresponding to each of the ANs in relation to the broadcast TDoA positioning.

On the other hand, when TDoA for PRSs received from the plurality of ANs is measured in a specific case, two or more positions can be estimated and measured. The ambiguity of TDoA measurement may be caused by the positional relationship between the plurality of ANs. Accordingly, when the positioning ambiguity for topology of the plurality of ANs is detected, the positioning UE can resolve the above positioning ambiguity, and as such a detailed description thereof will hereinafter be given in detail.

Figure 14:
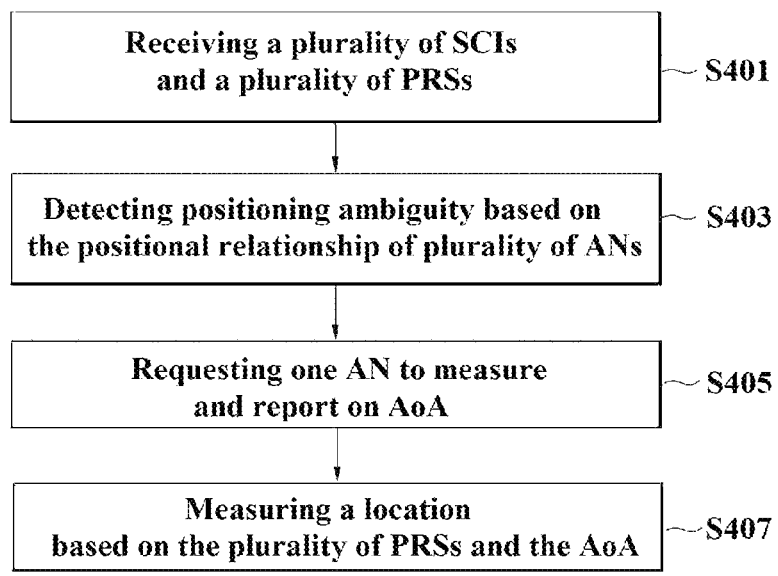
FIG. 14 is a flowchart illustrating a method for requesting an AoA report from one anchor node (AN) based on positioning ambiguity of TDoA detected by a positioning UE.

FIG. 14 is a flowchart illustrating a method for requesting an AoA report from one AN based on positioning ambiguity of TDoA detected by the positioning UE.

Referring to FIG. 14, the positioning UE may receive scheduling information (or SCI) related to a PRS from the plurality of ANs (or the AN group) and a PRS caused by such scheduling (S401). The positioning UE may acquire position information for each of the ANs and information about the PRS resource pool that is pre-configured in each AN. In contrast, the scheduled information related to the RPS and the SCI may be received through a PSCCH or a PSSCH.

The positioning UE may acquire the positional relationship between the plurality of ANs based on location information obtained from the received SCI (or PRS scheduling information), and may detect whether or not the positioning ambiguity caused by the positional relationship of the ANs exists (S403).

Specifically, the positioning UE may acquire position information for each of the plurality of ANs based on PSCCH information received from the plurality of ANs (or SCI included in the PSCCH). Based on the acquired position information, the positioning UE may determine whether or not the positioning ambiguity is present based on the arrangement structure of the ANs. For example, when the plurality of ANs is arranged in a line or is arranged to be biased in a specific direction from the viewpoint of the positioning UE, or when the ANs are arranged in a predetermined angular range with respect to the positioning UE, the positioning UE may determine that the ambiguity exists in TDoA location measurement or estimation based on PRSs of the plurality of ANs.

For example, when the ANs are arranged in a line, when the ANs are arranged to be biased in a specific direction from the positioning UE, or when the ANs are arranged only in a specific angular range with respect to the positioning UE, the positions of at least two ANs can be estimated or measured in a process in which TDoA location measurement or estimation is performed based on the PRSs of the plurality of ANs. In this case, it is impossible for the positioning UE to accurately estimate the position thereof.

As described above, the positioning UE can detect or determine whether the positioning ambiguity occurs by AN topology analysis based on the position information of the plurality of ANs, and can perform the following procedure when occurrence of the positioning ambiguity is detected.

When the occurrence of the positioning ambiguity is detected or expected, the positioning UE may select an AN for which AoA measurement and reporting will be requested from among the ANs (or the plurality of ANs participating in TDoA positioning) having transmitted the PSCCH. As descried above, the positioning ambiguity can be sufficiently resolved using the AoA measured in one AN.

In order to use the above-described AoA, the positioning UE needs to request the AoA measurement and reporting from any one of the plurality of ANs. Here, in order to select one AN, the positioning UE may consider the quality or strength of signals received from the plurality of ANs. Specifically, the positioning UE may measure a Reference Signal Received Signal (RSRP) for a Demodulation Reference Signal (DMRS) received from the AN, or may measure a Received Signal Strength Indicator (RSSI) for PSCCH and PSCCH. Thereafter, the positioning UE may select an AN having the best link quality to be the AoA reporting object on the basis of the measurement value. Alternatively, the positioning UE may sense the PRS pool allocated to each AN of FIG. 11(a), and may select an AN, in which a PRS pool having the largest number of unused PRSs from among the plurality of ANs, to be an AoA reporting object.

Next, the positioning UE can request AoA measurement and reporting from the one AN selected from among the ANs (S405). The positioning UE may transmit the PRS to the selected one AN for the request. Here, the PRS may be transmitted in a preconfigured PRS resource pool corresponding to the selected one AN. Here, the PRS may be transmitted in the PRS resource pool pre-configured corresponding to the one AN. That is, the positioning UE can acquire information on the PRS resource pool that is pre-configured differently according to the plurality of ANs based on the plurality of SCIs, and can request the AoA measurement and reporting by transmitting a PRS for the AoA measurement and reporting in the PRS resource pool corresponding to the one AN.

In order to transmit the PRS to the one AN, the positioning UE can perform a procedure of reserving or selecting the PRS to be transmitted to the selected AN. In other words, the positioning UE can select and transmit a PRS to be used as a basis of AoA measurement in the PRS pool corresponding to the selected AN. The PRS transmission process from the positioning UE may correspond to a procedure for enabling the UE to request the AoA measurement and reporting from the AN. A reservation or selection procedure of a specific PRS can be performed through the PRS LBT operation or the sensing operation.

The positioning UE can select a PRS by performing the PRS LBT operation including a back-off process. Specifically, the positioning UE may perform sensing during a predetermined NR-V2X slot period for a PRS pool corresponding to the selected AN, and may arbitrarily select at least one PRS (or observation PRSs) from among the unused PRS. In this case, the number of selected PRSs may be set to one or more. The positioning UE may perform a backoff process on the at least one selected PRS. At this time, the backoff value can be randomly selected within a time range predefined to have a standby time (or the number of NR-V2X slots) required for selecting the final PRS. In addition, when the PRS being observed in every NR-V2X slot is not used, the backoff value may be reduced one by one. In contrast, when the PRS being observed in every NR-V2X slot is being used, the backoff value may be temporarily stopped (holding). Alternatively, when the use of the at least one PRS is not detected, the positioning UE may reduce the selected backoff value one by one. When the backoff value configured through the backoff process is set to zero "0", the positioning UE may select one of the PRSs being observed (or the at least one PRS), and may transmit the selected PRS. In this case, when the number of PRSs being observed (or the number of one or more PRSs) is set to 2 or more, the positioning UE may finally select one PRS which has first reached the backoff value "0" from among the at least one PRS, and may transmit the selected PRS to the selected AN.

Alternatively, the positioning UE may select a PRS to be transmitted to the selected AN through pre-reservation. When the PRS to be transmitted by the positioning UE is reserved through a PSCCH, the positioning UE senses PSCCH information received from the surrounding UE for such PRS reservation, and then reserves the PRS pattern and the PRS position that are not used or are not scheduled to be used.

That is, the positioning UE may transmit the PRS based on a reservation PRS (PRS pattern, PRS transmission position, PRS pattern retention time, etc.) selected in the above-described selection or reservation procedure, and may request PRS-based AoA measurement and reporting from the one AN.

Next, the positioning UE can acquire information on the measured AoA from the one AN. As described above, when the AN receives the PRS within the PRS resource pool that was pre-configured in correspondence with the AN itself, the AN may perform the AoA measurement process using an automatic response function, and may transmit the measured AoA to the positioning UE through the PSSCH.

Here, the positioning UE can receive a UE ID and/or a PRS ID from the selected AN together with the measured AoA. In other words, the selected AN may transmit information about the UE ID and/or the PRS ID when the measured AOA is transmitted. Here, the positioning UE may receive the AoA, the UE ID, and/or the PRS ID through a PSCCH or a PSSCH in the NR-V2X service resource separate from the PRS pool.

Meanwhile, when the positioning UE transmits the PRS through the PRS LBT process, the positioning UE can receive the PRS ID and the AoA together. In other words, when the PRS received from the UE is transmitted through the PRS LBT process, the AN may transmit the AoA together with a PRS ID. In addition, when the ANs are well distributed around the positioning UE and the occurrence of positioning ambiguity is not expected, the positioning UE may not perform the operation for requesting the AoA measurement and reporting from the subsequent ANs in a subsequent process. In this case, the PRS ID may be related to the PRS pattern.

Next, the positioning UE can perform TDoA positioning using the AoA information received from the selected AN (S407). Specifically, after obtaining the SCI information related to each AN through demodulation of the PSCCH received from the plurality of ANs, the positioning UE may receive a PRS from each of the ANs based on the SCI information, and may measure ToA based on the received PRS. In this case, the positioning UE may measure the TDoA based on the measured ToA, and may estimate the position thereof through the measured TDoA.

However, as described above, when the positioning ambiguity is predicted or sensed based on the arrangement structure between the plurality of ANs, the positioning UE can estimate or measure two or more positions through the TDoA. If such positioning ambiguity is detected or predicted, the positioning UE may receive the AoA report by transmitting the PRS to a specific AN as described above, and may resolve the positioning ambiguity by additionally considering the received AoA.

For example, if the number of estimated positions of the positioning UE is set to at least two according to the TDoA due to the positioning ambiguity, the positioning UE can determine an estimated position corresponding to the positioning UE itself from among the at least two estimated positions. In other words, when the number of intersection coordinates of two hyperbolic curves based on TDoA is set to 2 or more, the positioning UE can finally select coordinates of one intersection through the reported AoA information.

According to an embodiment, the positioning UE can receive scheduling information of the PRS or an SCI including the PRS scheduling information from each of the ANs located around the positioning UE. The positioning UE can acquire a PRS resource pool corresponding to each of the plurality of ANs based on the received SCI, and can acquire position information of each of the plurality of ANs based on the received SCI. The positioning UE can detect or determine whether positioning ambiguity is present in TDoA based on the received PRSs in consideration of the positional relationship between the plurality of ANs prior to measuring the TDoA on the basis of the received PRSs. For example, when the plurality of ANs is arranged in a line, when the plurality of ANs is arranged to be biased in a specific direction, or when the plurality of ANs is disposed in a predetermined angular range with respect to the positioning UE, the positioning UE may determine the presence of TDoA positioning.

When the positioning ambiguity is detected (or detected), the positioning UE can request any one of the plurality of ANs to perform AoA measurement and reporting. Here, the AoA measurement and report requesting may be performed by transmitting the PRS in a PRS resource pool corresponding to the one AN.

Alternatively, the positioning UE may select or determine one AN to be used for the AoA measurement and reporting based on the quality or strength of signals of SCI or PRS received from each of the plurality of ANs. For example, the positioning UE may select or determine an AN, that has transmitted an SCI or PRS having the highest RSRP or the highest RSSI, to be one AN scheduled to request the AoA measurement and reporting.

Alternatively, the positioning UE may select or determine one AN to be used for requesting the AoA measurement and reporting based on a result of sensing a PRS resource pool configured differently for each of the plurality of ANs. For example, among the PRS resource pools for the respective ANs, a PRS resource pool in which the smallest number of signals such as PRSs was detected may be determined, and an AN corresponding to the determined PRS resource pool may be selected or determined to be one AN to be used for requesting the AoA measurement and reporting.

The positioning UE may transmit the PRS in the PRS resource pool corresponding to the selected one AN so as to request AoA measurement and reporting from the one AN. After transmitting the PRS, the positioning UE may receive the measured AoA from the one AN. Here, the AoA can be received by the positioning UE together with identification (ID) information related to the PRS transmitted by the positioning UE and/or identification (ID) information of the positioning UE.

When at least two positions are estimated or measured from the measured TDoA based on PRSs received from the plurality of ANs due to the occurrence of positioning ambiguity, the positioning UE can determine an accurate position corresponding to the position thereof from among the two or more positions in consideration of information on the AoA.

As described above, the positioning UE can resolve the positioning ambiguity of TDoA, which can be caused by the topology of the AN, through a separate AoA reporting request when the positioning ambiguity is detected through the topology of the AN during the broadcast TDoA positioning process. In addition, the positioning UE can determine in advance the presence or absence of positioning ambiguity that can be caused by AN topology using the AN position information transmitted to the PSCCH, so that the positioning UE can increase the accuracy of broadcast TDoA positioning and can minimize the time required for such positioning. In addition, since the positioning UE can request the AoA measurement and reporting from only one AN based on the PRS pool, the positioning UE can greatly reduce computational load and signaling overhead of the ANs. In addition, according to the AoA measurement/report requesting method and the AoA response method, the AN need not additionally accept the AoA measurement request of the positioning UE and need not additionally request a separate signaling process for specifying the AN to be used for AoA measurement, resulting in implementation of fast broadcast TDoA positioning.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 15:
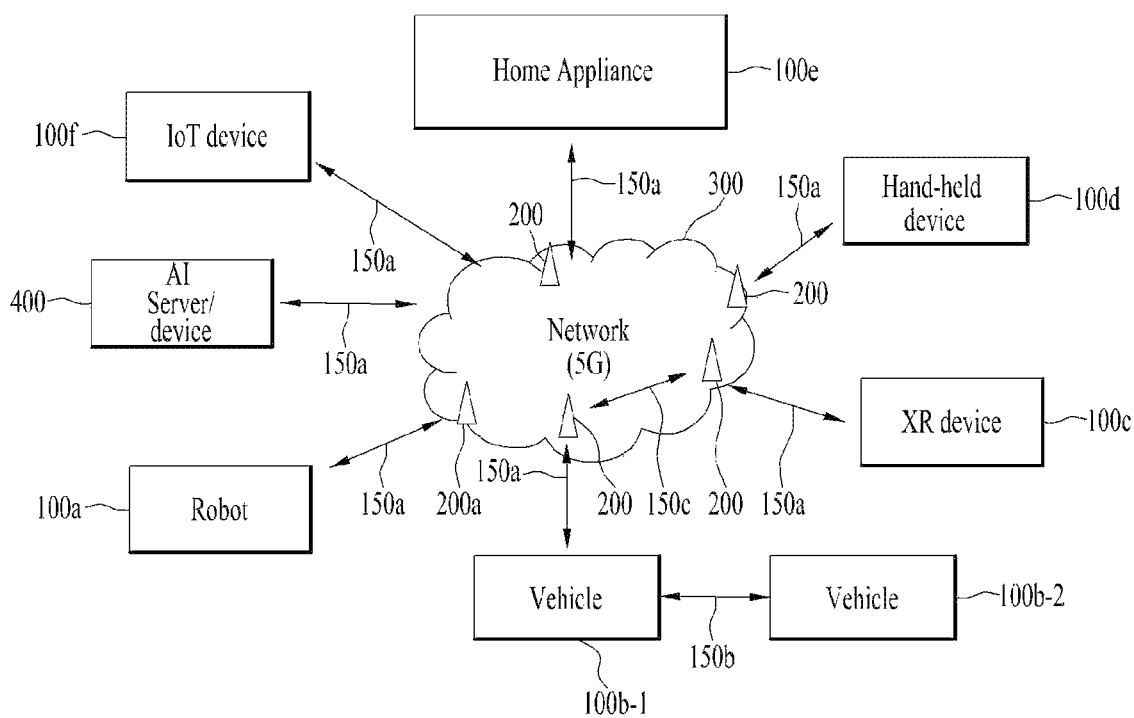
FIG. 15 illustrates a communication system applied to the present disclosure.

FIG. 15 illustrates a communication system applied to the present disclosure.

Referring to FIG. 15, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 16:
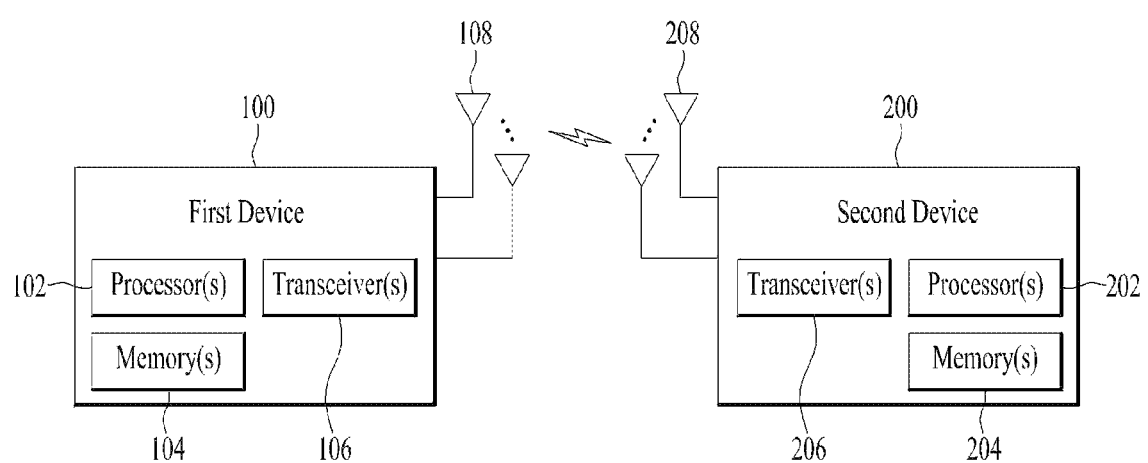
FIG. 16 illustrates wireless devices applicable to the present disclosure.

FIG. 16 illustrates a wireless device applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the UE may include a processor 102 and a memory 104 that are connected to the RF transceiver. The memory 104 may include at least one program capable of performing the operation related to the embodiments shown in FIGS. 10 to 14.

The processor 102 may control the RF transceiver to receive a plurality of SCIs including PRS scheduling information from the plurality of anchor nodes (ANs), may control the RF transceiver to receive a plurality of PRSs based on the plurality of SCIs, may sense the ambiguity of positioning measurement based on the plurality of PRSs according to the positional relationship between the plurality of ANs, may request AoA reporting from one AN selected from among the plurality of ANs based on the sensed positioning measurement ambiguity, and may measure the position of the UE based on the plurality of PRSs and the reported AoA.

Alternatively, the chip set including the processor 102 and the memory 104 may be configured. In this case, the chip set may include at least one processor, and at least one memory operatively connected to the at least one processor and configured to store instructions such that the at least one processor performs specific operations by executing the instructions. The specific operations may include receiving a plurality of SCIs including PRS scheduling information from the plurality of anchor nodes (ANs), receiving a plurality of PRSs based on the plurality of SCIs, sensing the ambiguity of positioning measurement based on the plurality of PRSs according to the positional relationship between the plurality of ANs, requesting AoA reporting from one AN selected from among the plurality of ANs based on the sensed positioning measurement ambiguity, and measuring the UE position based on the plurality of PRSs and the reported AoA. The above-described operations may include the position measurement operations described with reference to FIGS. 10 to 14 based on the program included in the memory 104.

Alternatively, a computer-readable storage medium is configured to store at least one computer program including instructions such that at least one processor performs specific operations by executing the instructions. The specific operations may include receiving a plurality of SCIs including PRS scheduling information from the plurality of anchor nodes (ANs), receiving a plurality of PRSs based on the plurality of SCIs, sensing the ambiguity of positioning measurement based on the plurality of PRSs according to the positional relationship between the plurality of ANs, requesting AoA reporting from one AN selected from among the plurality of ANs based on the sensed positioning measurement ambiguity, and measuring the UE position based on the plurality of PRSs and the reported AoA. The above-described operations may include the position measurement operations described with reference to FIGS. 10 to 14 based on the program included in the memory 104. The above-described operations may include the position measurement operations of the positioning UE described with reference to FIGS. 10 to 14 based on the program included in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 17:
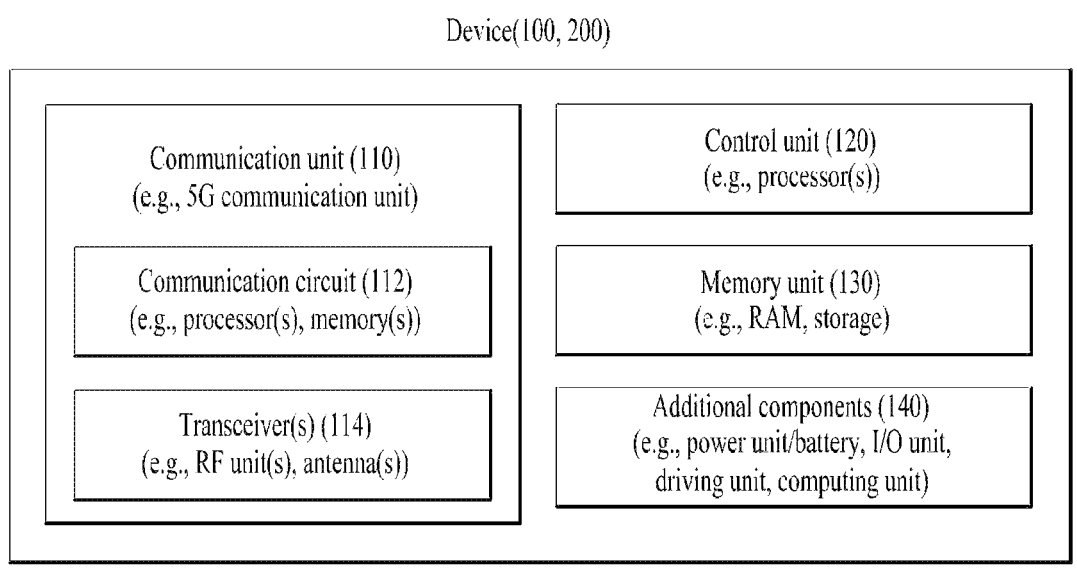
FIG. 17 illustrates another example of a wireless device to which the present disclosure is applied. The wireless device may be implemented in various forms according to use-examples/services.

FIG. 17 illustrates another example of a wireless device applied to the present disclosure. The wireless device may be implemented in various forms according to a use-case/service (refer to FIG. 15).

Referring to FIG. 17, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 18:
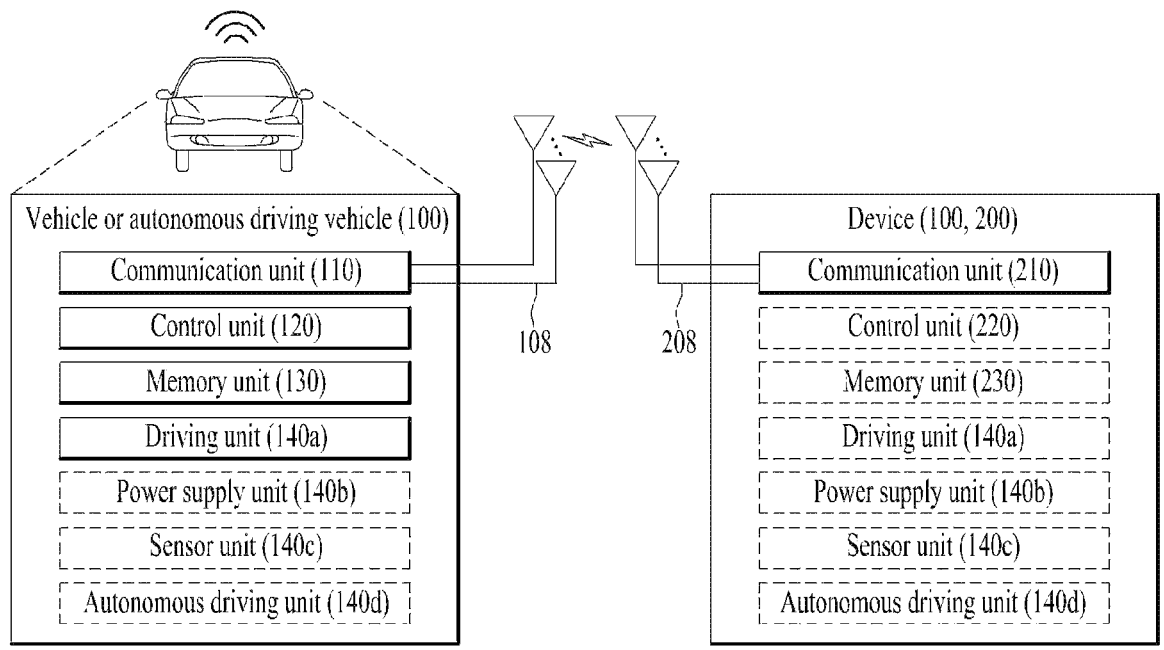
FIG. 18 illustrates a vehicle or an autonomous driving vehicle applied to the present disclosure.

Examples of Vehicles or Autonomous Vehicles to which the Present Disclosure is Applied FIG. 18 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 18, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method for performing positioning by a user equipment (UE) in a wireless communication system comprising:
receiving control information including scheduling information for a positioning reference signal (PRS) resource pool for direct communication between UEs, from each of a plurality of anchor nodes (ANs);
receiving a plurality of PRSs based on the control information;
detecting ambiguity of a position measurement using the plurality of PRSs based on an arrangement of the plurality of ANs;
based on the detection of ambiguity of the position measurement, requesting a report of an angle of arrival (AoA) to a specific AN selected from among the plurality of ANs, wherein the requesting of the report of the AoA is performed through transmission of a first PRS resource within the PRS resource pool scheduled by the control information of the specific AN;
receiving the AoA reported by the specific AN based on the first PRS; and
measuring a position of the user equipment (UE) based on the plurality of PRSs and the AoA.

2. The method according to claim 1, wherein the ambiguity of the positioning measurement is detected based on the arrangement of the plurality of ANs arranged within a predetermined angular range with respect to the UE.

3. The method according to claim 1, wherein the AoA is reported together with identification information corresponding to the transmitted PRS.

4. The method according to claim 1, wherein the specific AN is an AN corresponding to the PRS resource pool in which the smallest number of PRSs is detected from among a plurality of PRS resource pools for the plurality of ANs.

5. The method according to claim 1, wherein the specific AN is an AN having the largest reference signal received power (RSRP) or the largest received signal strength indicator (RSSI) from among the plurality of ANs.

6. The method according to claim 1, wherein the plurality of ANs includes ANs each having positioning quality information (PQI) that is equal to or greater than a preconfigured threshold.

7. A user equipment (UE) for performing positioning in a wireless communication system, the UE comprising:
a radio frequency (RF) transceiver; and
a processor connected to the RF transceiver,
wherein the processor is configured to:
receive a plurality of sidelink control information including scheduling information for a positioning reference signal (PRS), from each of a plurality of anchor nodes, ANs;
receive a plurality of PRSs based on the control information;
detect ambiguity of a position measurement using the plurality of PRSs based on an arrangement of the plurality of anchor nodes (ANs);
based on the detection of ambiguity of the position measurement, request a report of an angle of arrival (AoA) to a specific AN selected from among the plurality of ANs,
wherein the requesting of the report of the AoA is performed through transmission of a first PRS resource within a PRS resource pool scheduled by the control information of the specific AN;
receiving the AoA reported by the specific AN based on the first PRS; and
measure a position of the user equipment (UE) based on the plurality of PRSs and the AoA.

8. The user equipment according to claim 7, wherein the ambiguity of the positioning measurement is detected based on the arrangement of the plurality of ANs arranged within a predetermined angular range with respect to the UE.

9. A chip set for performing positioning in a wireless communication system, the chip set comprising:
at least one processor; and
at least one memory operatively connected to the at least one processor, and configured to store instructions such that the at least one processor performs operations by executing the instructions,
wherein the operations include:
receiving sidelink control information (SCI) including scheduling information for a positioning reference signal (PRS) resource pool, from each of a plurality of anchor nodes, ANs;
receiving a plurality of PRSs based on the control information;
detecting ambiguity of a position measurement using the plurality of PRSs based on an arrangement of the plurality of ANs;
based on the detection of ambiguity of the position measurement, requesting a report of an angle of arrival (AoA) to a specific AN selected from among the plurality of ANs, wherein the requesting of the report of the AoA is performed through transmission of a first PRS resource within the PRS resource pool scheduled by the control information of the specific AN;

receiving the AoA reported by the specific AN based on the first PRS; and measuring a position of a user equipment (UE) based on the plurality of PRSs and the AoA.

\* \* \* \* \*